Figure 1:
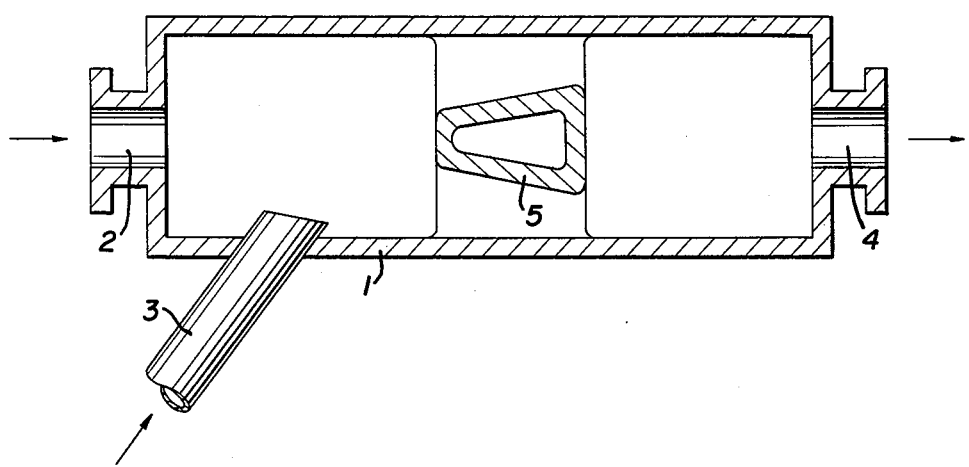
Figure 2:
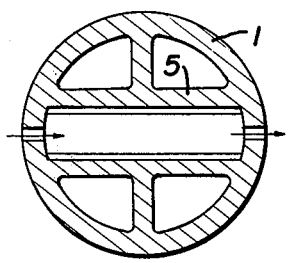

United States Patent [19]

Schwarz et al.

[11] 3,976,432

[45] Aug. 24, 1976

[54] REACTOR HAVING AN AUSTENITE STEEL CATALYST FOR PURIFYING FLUE GAS

[75] Inventors: Ferdinand Schwarz, Vienna; Erich Bauer, Unter-Eggendorf, both of Austria

[73] Assignee: Osterreichische Mineralolverwaltung Aktiengesellschaft, Vienna, Austria

[22] Filed: Aug. 17, 1973

[21] Appl. No.: 389,090

[30] Foreign Application Priority Data

Aug. 22, 1972 Austria .............................. 7231/72

[52] U.S. Cl. ................... 23/288 FC; 23/288 F; 23/288 K; 60/298; 60/299; 252/472

[51] Int. Cl.² ...................... B01J 1/14; B01J 23/74; F01N 3/15

[58] Field of Search ............ 23/288 K, 288 L, 288 F; 60/298, 299; 252/472

[56] References Cited

UNITED STATES PATENTS

| | | | |
|---|---|---|---|
| 1,465,904 | 8/1923 | Herdle.............................. | 23/288 F |
| 1,697,263 | 1/1929 | Ellis.................................. | 252/472 X |
| 1,811,762 | 6/1931 | Schwell........................... | 23/288 F |
| 1,909,133 | 5/1933 | Silverman et al.................. | 252/472 |
| 2,620,893 | 12/1952 | Holt et al. ........................ | 23/288 F |
| 2,709,159 | 5/1955 | Davssat............................ | 252/472 X |
| 2,856,905 | 10/1958 | Bowen.............................. | 23/288 F |
| 3,295,919 | 1/1967 | Henderson et al. ............... | 23/288 F |
| 3,362,783 | 1/1968 | Leak................................. | 23/288 F |
| 3,367,888 | 2/1968 | Hoekstra.......................... | 252/472 X |
| 3,493,325 | 2/1970 | Roth ................................ | 252/472 X |
| 3,554,929 | 1/1971 | Aarons............................. | 252/472 X |
| 3,661,806 | 5/1972 | Briggs et al. ..................... | 252/472 X |
| 3,665,711 | 5/1972 | Muroki ............................. | 60/298 |
| 3,713,783 | 1/1973 | Greipel............................. | 23/288 F |
| 3,747,346 | 7/1973 | Onoda et al. ..................... | 60/298 |
| 3,751,385 | 8/1973 | Manning........................... | 252/472 |

*Primary Examiner*—Joseph Scovronek
*Assistant Examiner*—Bradley R. Garris
*Attorney, Agent, or Firm*—Beveridge, DeGrandi, Kline & Lunsford

[57] ABSTRACT

A reaction chamber for combustion of the carbon monoxide content of flue gas, comprising a casing and a catalyst of austenite steel for ignition of the carbon monoxide content of the flue gas, wherein said catalyst of austenite steel is located in said casing downstream the mixing point of said flue gas with combustion air, so that a reliable catalytic ignition of the streaming flue gas is given without the use of any support fire and without any admixture of heating gases.

5 Claims, 2 Drawing Figures

REACTOR HAVING AN AUSTENITE STEEL CATALYST FOR PURIFYING FLUE GAS

The invention relates to a reaction chamber for combustion of the carbon monoxide content of flue gas, in particular of flue gas accruing in a cracking process.

Flue gases deriving from plants in which hydrocarbons are processed generally have a large carbon monoxide content. Compared to this, the flue gases coming from boiler furnace plants usually have no appreciable carbon monoxide content, as the carbon monoxide content is burned in the combustion zone with the exception of minor, negligible residues.

In order to protect the environment, flue gas with a substantial carbon monoxide content must not be passed off into the surrounding area without first eliminating the carbon monoxide it contains.

It is already known to conduct flue gases with a substantial carbon monoxide content into a reaction chamber in which a catalyst for their ignition is located, so that catalytic conbustion of the carbon monoxide content takes place. Up to now, catalysts proposed for the combustion of flue gases whose essential component is carbon monoxide have been the elements Cr, Wo, Va, Fe, U, Mo, Cu, Ag, Hg, Ni, Pl, Mn, Cer, Ti, J, N, their oxides and mixtures thereof. So, for instance, German Offenlegungsschrift No. 2,062,225 suggests the use of iron and British Pat. Specification No. 134,243 suggests the use of iron-, chromium- or cerium oxide as contact material. Most catalysts known up to now, according to their structure, consist of a thin layer of catalytically active material which is precipitated onto a carrier of large surface, such as kieselgur and silica gel, aluminum oxide in ball-, cube or bead form or the like. Metal such as steel wool has been used as a carrier, as well. From other publications, such as German Auslegeschrift No. 1,021,337 and British Pat. Specification No. 591,669, it is known to apply the catalytic coating immediately to the surface of heat exchangers.

But all of these known processes of catalytic combustion of flue gas are expensive and uncertain in function, as they are sensitive to changes in temperature and to poisoning. The catalyst material has a relatively short life, not only because of the possibility of poisoning, but also due to the abrasion which occurs when eroding particles are carried along in the flue gas. This particularly applies in the case of flue gas originating from plants in which catalyst material obtained in catalytic cracking plants of coke is burned.

It is the object of the invention to avoid these disadvantages and to provide a reaction chamber in which a reliable catalytic ignition of the streaming flue gas is given without the use of any support fire and without any admixture of heating gases.

According to the invention, a reaction chamber for combustion of the carbon monoxide content of flue gas is provided, comprising a casing and a catalyst of austenite steel for ignition of the carbon monoxide content of the flue gas, wherein said catalyst of austenite steel is located in said casing downstream the mixing point of said flue gas with combustion air.

This arrangement secures a reliable ignition of flue gas, provided that the flue gas has a carbon monoxide content of at least 0.1 percent by weight. In addition, the catalytic effectiveness of austenite steel remains virtually unchanged within a wide temperature range.

Tests have shown that an active surface of about 3200 sq. ft. of the catalyst consisting of austenite steel is sufficient for the satisfactory ignition of about 50.000 normal cubic meters per hour of the flue gas-air mixture.

These and other objects will be disclosed in the course of the following specification by reference to the accompanying drawing.

The illustrated reaction chamber comprises a casing 1 which has an inlet 2 for the flue gas and a further inlet 3 for the combustion air as well as an outlet 4 for the flue gas. A catalyst 5 of austenite steel is located in the casing 1.

Although it is known per se to use austenite steel in furnace plants of the general type, in particular for the boiler- and superheater pipes in boiler furnace plants, the solution according to the invention is highly surprising to the expert in the art. In these known boiler furnace plants, a nearly complete combustion of the carbon monoxide content occurs in the combustion zone proper. This means that the flue gases passing the boiler- or superheater pipes made of austenite steel do not contain any appreciable amount of carbon monoxide, so that the effect of the present invention, namely, the catalyst effect of austenite steel in respect to flue gas with a carbon monoxide content of at least 0.1 percent by weight, was not recognized previously.

In a reaction chamber according to the invention, said part made of austenite steel can have the embodiment of a wall section of the reaction chamber or of a building element integrally connected to the latter. The strength of austenite steels and their other material properties permit the production of reaction chambers, pipes, baffles and the like of the austenite steel itself, with the type of steel, i.e. its content of added alloy elements, to be chosen according to the requirements of the construction, as this selection is without practical influence on the course of the reaction. It is thus not necessary to apply the austenite steel in the form of a coating on a carrier with a large surface, as normally, the surfaces in the reaction chamber of an optionally provided heat exchanger and the other customary parts being made of austenite steel are sufficient to obtain the desired effect. Depending upon the composition of the flue gas, added air and pressure, temperatures between 540 and 560°C are sufficient to initiate and maintain oxidation of the carbon monoxide with certainty, in such a manner that 95 to 98 percent of the combustible content of the flue gas are burned, without having to add heating gas or provide a support fire. A favorable reaction course was observed at pressures as low as 14.5 lbs/sq.in. High turbulence of the flue gas promotes ignition.

The nearly complete combustion of the carbon monoxide and, as a result, of the other combustible components, thus makes the flue gas virtually free of poison, provided that it does not contain any sulphur. But a sulphur content of the flue gas does not have a detrimental effect on the combustion of carbon monoxide. The only consequence might be that the sulphur dioxide would have to be desulphurated before letting the burned gas out of the chimney into the open air.

It is further of advantage when the part serving as a catalyst is of hollow embodiment and has a cooling agent flowing through it.

EXAMPLE

A vertically positioned, cylindrical reaction chamber has a diameter of about 7.5 feet and a height of 9.0 feet. Into the lower part of this reaction chamber, flue gas with a content of about 7 percent carbon monoxide in amounts of about 50.000 normal cubic meters per hour and about 10.000 normal cubic meters per hour of air are conducted, the air having been preheated to such an extent that the flue gas - air mixture has a temperature of approximately 560°C, under a pressure of about 0.7 lbs/sq.in. The reaction chamber is provided with catalyst parts in the form of baffles of austenite steel and heat exchanger surfaces also at least partially made of austenite steel. These baffles are arranged in the flowing direction of the flue gas downstream the mixing point of flue gas and combustion air. The active surface of the austenite steel catalyst in this is about 3200 sq. ft. Through the heat exchanger, water is conducted as a cooling medium, in order to produce steam. Through a vent in the upper part of the cylinder, the flue gas, which has been cooled to about 200°C and afterburned, is passed off, the carbon monoxide content of the flue gas no longer being determinable with the commercially available plant carbon monoxide measuring instruments. The combustion process or the course of the reaction may have to be regulated in order to avoid overheating. This control is best effected by means of regulating the amount and temperature of the combustion air and the arrangement of air supply lines in suitable areas of the reaction chamber. If the combustion air is to be preheated, it is of advantage to use some of the parts of the reaction chamber for this purpose.

The heat energy set free in the reaction chamber according to the present invention, thanks to the simplicity and sturdiness of this chamber, can be utilized for the most diverse purposes, for instance, in a refinery, it can also be used for heating the material to be processed.

We claim:

1. An apparatus for the purification of waste flue gas comprising:
    a casing having inlet and outlet means and a separate combustion air inlet means, and
    a catalyst means constructed wholly of austenite steel contained in said casing, downstream from said separate combustion air inlet means, for the ignition of said flue gas.

2. An apparatus according to claim 1, wherein said catalyst means forms a part of said casing.

3. An apparatus according to claim 1, wherein said catalyst means is integral with the wall of said casing.

4. An apparatus according to claim 1 wherein said catalyst means comprises a hollow body having means for the passage of a cooling medium therethrough.

5. An apparatus for combustion of the carbon monoxide content of waste flue gas generated in a cracking process comprising:
    a casing having an inlet means for said flue gas,
    a separate combustion air inlet means,
    an outlet means for the purified flue gas; and
    catalyst means constructed wholly of austenite steel in said casing downstream from said air inlet means for the ignition of said flue gas, said catalyst means being an integral part of said casing.

* * * * *